US010807460B2

(12) United States Patent
Lor et al.

(10) Patent No.: US 10,807,460 B2
(45) Date of Patent: Oct. 20, 2020

(54) METHOD OF CONTROLLING A POWERTRAIN SYSTEM OF A VEHICLE

(71) Applicant: GM Global Technology Operations LLC, Detroit, MI (US)

(72) Inventors: Love Lor, Farmington Hills, MI (US); Jared Kalnins, Waterford, MI (US); Vino Mathew, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/352,374

(22) Filed: Mar. 13, 2019

(65) Prior Publication Data

US 2020/0290449 A1   Sep. 17, 2020

(51) Int. Cl.
*B60W 10/08* (2006.01)
*B60K 6/547* (2007.10)
*B60W 10/06* (2006.01)
*B60W 20/30* (2016.01)

(52) U.S. Cl.
CPC .............. *B60K 6/547* (2013.01); *B60W 10/06* (2013.01); *B60W 10/08* (2013.01); *B60W 20/30* (2013.01); *B60W 2710/0672* (2013.01); *B60W 2710/083* (2013.01)

(58) Field of Classification Search
CPC ....... B60K 6/547; B60W 10/06; B60W 10/08; B60W 20/30; B60W 2710/0672; B60W 2710/083
See application file for complete search history.

(56) References Cited

U.S. PATENT DOCUMENTS

| | | | | |
|---|---|---|---|---|
| 9,989,103 | B2* | 6/2018 | Antchak | F02B 67/06 |
| 2011/0083309 | A1* | 4/2011 | Kshatriya | B60K 1/00 29/401.1 |
| 2011/0083918 | A1* | 4/2011 | Kshatriya | B60K 6/485 180/65.26 |
| 2011/0083919 | A1* | 4/2011 | Kshatriya | B60L 53/305 180/65.26 |
| 2011/0087390 | A1* | 4/2011 | Pandit | B60K 1/00 701/22 |
| 2011/0087391 | A1* | 4/2011 | Pandit | B60K 6/485 701/22 |
| 2011/0087392 | A1* | 4/2011 | Kshatriya | B60K 6/485 701/22 |

\* cited by examiner

*Primary Examiner* — David J Hlavka

(57) ABSTRACT

A method for controlling the powertrain system for a vehicle improves powertrain performance. The powertrain system includes an internal combustion engine comprising a crankshaft, an isolator assembly, a motor generator unit, and a powertrain control module. The isolator assembly includes a first member fixedly connected for common rotation with the crankshaft of the internal combustion engine and a second member. The motor generator unit includes a pulley coupled with the second member of the isolator assembly for torque transfer. The powertrain control module comprises a control logic sequence and controls the operation of the powertrain system.

19 Claims, 3 Drawing Sheets

METHOD OF CONTROLLING A POWERTRAIN SYSTEM OF A VEHICLE

INTRODUCTION

The present disclosure relates generally vehicle powertrain control and more particularly to methods of controlling a vehicle powertrain integrating an internal combustion engine (ICE) and a motor generator unit (MGU).

Powertrains for vehicles include additional sources of torque that are used to propel the vehicle down the road. While some vehicles are now designed with exclusively ICE or electric motors, some powertrains have combined ICE and electric motors into one powertrain. However, the marrying of two or more sources of torque can cause drivability issues when switching from one source to another. Regardless of which torque source is employed, the torque must still make it to the same place; the drive wheels of the vehicle.

Accordingly, there is a need in the art for improved powertrain control and methods of controlling a powertrain having multiple sources of torque. Improvements in drivability, cost, and energy efficiency will result from the improved powertrain controls.

SUMMARY

A powertrain system for a vehicle is provided including an internal combustion engine, and isolator assembly, a motor generator unit, and a powertrain control unit. The internal combustion engine comprises a crankshaft. The isolator assembly includes a first member and a second member. The first member is fixedly connected for common rotation with the crankshaft of the internal combustion engine. The motor generator unit includes a third member coupled with the second member of the isolator assembly for torque transfer. The powertrain control module comprises a control logic sequence, is in communication with the internal combustion engine and the motor generator unit, and controls the operation of the powertrain system.

In one example of the present disclosure, the isolator assembly further comprises a first set of resilient members and a second set of resilient members. The first and second set of resilient members are disposed between the first member and the second member. The second member of the isolator assembly is a first pulley.

In another example of the present disclosure, the first set of resilient members of the isolator assembly are a first set of springs having a first spring constant and the second set of resilient members of the isolator assembly are a second set of springs having a second spring constant.

In yet another example of the present disclosure, the third member of the motor generator unit is a second pulley, and the powertrain system further comprises a belt disposed on the first pulley of the isolator assembly and the second pulley of the motor generator unit.

In yet another example of the present disclosure, the control logic sequence of the powertrain control module includes a first control logic for determining when a command torque of the motor generator unit is within a soft spring lash zone. A second control logic decides when the command torque is within an achievable threshold when the command torque is within the soft spring lash zone. A third control logic applies a compensating communication delay for the command torque when the command torque is not within the achievable threshold. A fourth control logic applies a lash zone rate limit when the command torque is within the achievable threshold.

In yet another example of the present disclosure, a fifth control logic determines when a first error between a steady state speed of the internal combustion engine and a speed of the motor generator unit.

In yet another example of the present disclosure, a sixth control logic applies a variable rate of change limit on the command torque when the first error is greater than a particular threshold.

In yet another example of the present disclosure, a seventh control logic determines an amount of belt slip for which to account for by applying a belt slip compensation which uses the speed of the motor generator unit and a pulley ratio function resulting in a pulley speed and produces the speed of the motor generator unit in a crankshaft domain using the pulley speed and a torque of the motor generator unit.

In yet another example of the present disclosure, the fourth control logic applying a lash zone rate limit when the command torque is within an achievable threshold further comprises applying a lash zone rate limit as determined by finding a second error between a speed of the internal combustion engine and the speed of the motor generator unit in the crankshaft domain and producing the torque rate of change using the second error, a rate limit function, and the command torque.

The present disclosure also provides method of controlling a powertrain system. The method comprises providing the powertrain system comprising an internal combustion engine, an isolator assembly, and a motor generator unit. The method further includes determining when a command torque of the motor generator unit is within a soft spring lash zone. The method further includes deciding when the command torque is within an achievable threshold when the command torque is with the soft spring lash zone. The method further includes applying a compensating communication delay for the command torque when the command torque is not within the achievable threshold. The method further includes applying a lash zone rate limit when the command torque is within the achievable threshold. The method further includes determining when a first error between a steady state speed of the internal combustion engine and a speed of the motor generator unit, and applying a variable rate of change limit on the command torque when the first error is greater than a particular threshold.

In one example of the present disclosure, providing the powertrain system comprising an internal combustion engine, an isolator assembly, and a motor generator unit further comprises providing the powertrain system comprising an internal combustion engine, an isolator assembly, and a motor generator unit, and wherein the isolator assembly comprises a first member and a second member, and wherein the first member is fixedly connected for common rotation with a crankshaft of the internal combustion engine.

In another example of the present disclosure, providing the powertrain system comprising an internal combustion engine, an isolator assembly, and a motor generator unit further comprises providing the powertrain system comprising an internal combustion engine, an isolator assembly, a motor generator unit, and a belt, and wherein the isolator assembly comprises a first member and a second member, the second member is a first pulley, the first member is fixedly connected for common rotation with a crankshaft of the internal combustion engine and the belt couples the first pulley of the isolator to a second pulley of the motor generator unit.

In yet another example of the present disclosure the method further includes determining an amount of belt slip for which to account for by applying a belt slip compensation which uses the speed of the motor generator unit and a pulley ratio function resulting in a first pulley speed and produces the speed of the motor generator unit in the crankshaft domain using the first pulley speed and a torque of the motor generator unit.

In yet another example of the present disclosure, providing the powertrain system comprising an internal combustion engine, an isolator assembly, and a motor generator unit, and wherein the isolator assembly comprises a first member and a second member, and wherein the first member is fixedly connected for common rotation with a crankshaft of the internal combustion engine further comprises providing the powertrain system comprising an internal combustion engine, an isolator assembly, and a motor generator unit, and wherein the isolator assembly comprises a first member and a second member, and wherein the first member is fixedly connected for common rotation with a crankshaft of the internal combustion engine, and wherein the motor generator unit comprises a third member coupled with the second member of the isolator assembly for torque transfer.

In yet another example of the present disclosure, applying a lash zone rate limit when the command torque is within an achievable threshold further comprises applying a lash zone rate limit as determined by finding a first error between a speed of the internal combustion engine and a speed of the motor generator unit in a crankshaft domain and producing a torque rate of change using the speed error, a rate limit function, and the command torque.

In yet another example of the present disclosure, applying a lash zone rate limit as determined by finding a first error between a speed of the internal combustion engine and a speed of the motor generator unit in a crankshaft domain, and producing a torque rate of change using the speed error, a rate limit function, and the command torque further comprises applying a lash zone rate limit as determined by finding a first error between a speed of the internal combustion engine and a speed of the motor generator unit in a crankshaft domain, producing a torque rate of change using the speed error, a rate limit function, and combining the torque rate of change with a previous torque rate of change resulting in a current torque rate of change to be commanded to the motor generator unit.

The present disclosure also provides a method of controlling a powertrain system. The method includes providing the powertrain system comprising an internal combustion engine, an isolator assembly, and a motor generator unit, and wherein the isolator assembly comprises a first member and a second member, and wherein the first member is fixedly connected for common rotation with a crankshaft of the internal combustion engine. The method also includes determining when a command torque of the motor generator unit is within a soft spring lash zone and deciding when the command torque is within an achievable threshold when the command torque is with the soft spring lash zone. The method also includes applying a compensating communication delay for the command torque when the command torque is not within the achievable threshold and applying a lash zone rate limit as determined by finding a first error between a speed of the internal combustion engine and a speed of the motor generator unit in a crankshaft domain and producing a torque rate of change using the speed error, a rate limit function, and the command torque. The method also includes determining when a first error between a steady state speed of the internal combustion engine and a speed of the motor generator unit and applying a variable rate of change limit on the command torque when the first error is greater than a particular threshold.

In one example of the present disclosure, providing the powertrain system comprising an internal combustion engine, an isolator assembly, and a motor generator unit further comprises providing the powertrain system comprising an internal combustion engine, an isolator assembly, a motor generator unit, and a belt, and wherein the isolator assembly comprises a first member and a second member, the second member is a first pulley, the first member is fixedly connected for common rotation with a crankshaft of the internal combustion engine and the belt couples the first pulley of the isolator to a second pulley of the motor generator unit.

In another example of the present disclosure the method further includes determining an amount of belt slip for which to account for by applying a belt slip compensation which uses the speed of the motor generator unit and a pulley ratio function resulting in a first pulley speed and produces the speed of the motor generator unit in the crankshaft domain using the first pulley speed and a torque of the motor generator unit.

In yet another example of the present disclosure, providing the powertrain system comprising an internal combustion engine, an isolator assembly, and a motor generator unit, and wherein the isolator assembly comprises a first member and a second member, and wherein the first member is fixedly connected for common rotation with a crankshaft of the internal combustion engine further comprises providing the powertrain system comprising an internal combustion engine, an isolator assembly, and a motor generator unit, and wherein the isolator assembly comprises a first member and a second member, and wherein the first member is fixedly connected for common rotation with a crankshaft of the internal combustion engine, and wherein the motor generator unit comprises a third member coupled with the second member of the isolator assembly for torque transfer.

In yet another example of the present disclosure, applying a lash zone rate limit as determined by finding a first error between a speed of the internal combustion engine and a speed of the motor generator unit in a crankshaft domain, and producing a torque rate of change using the speed error, a rate limit function, and the command torque further comprises applying a lash zone rate limit as determined by finding a first error between a speed of the internal combustion engine and a speed of the motor generator unit in a crankshaft domain, producing a torque rate of change using the speed error, a rate limit function, and combining the torque rate of change with a previous torque rate of change resulting in a current torque rate of change to be commanded to the motor generator unit.

The above features and advantages and other features and advantages of the present disclosure are readily apparent from the following detailed description when taken in connection with the accompanying drawings.

BRIEF DESCRIPTION OF THE DRAWINGS

The drawings described herein are for illustration purposes only and are not intended to limit the scope of the present disclosure in any way.

DESCRIPTION

The following description is merely exemplary in nature and is not intended to limit the present disclosure, application, or uses.

Figure 1:
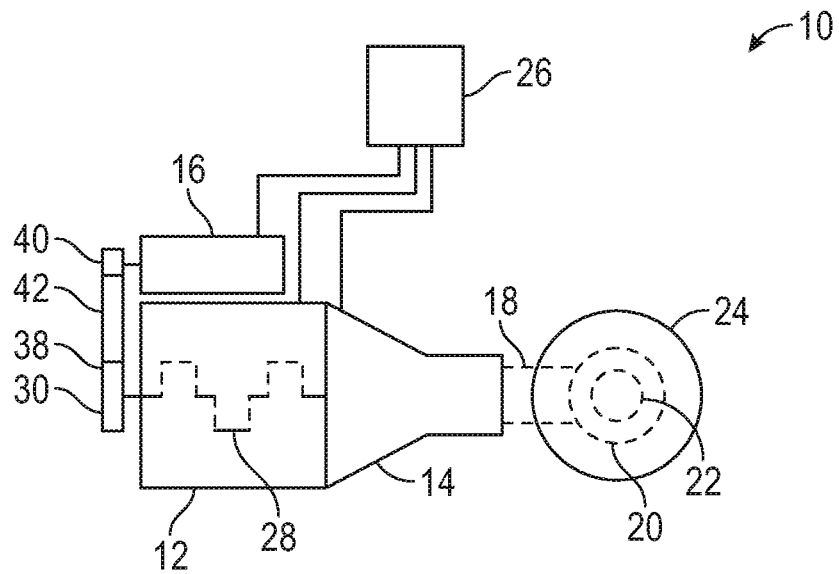
FIG. 1 is a schematic view of an powertrain assembly according to the principles of the present disclosure.
Figure 2A:
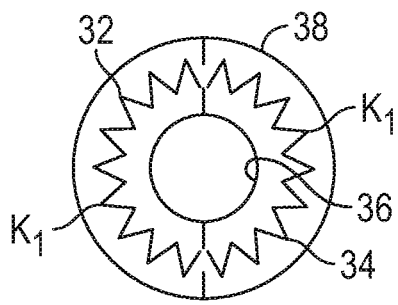
FIG. 2A is a schematic end view of an isolator pulley assembly for a powertrain assembly in a first position according to the principles of the present disclosure.
Figure 2B:
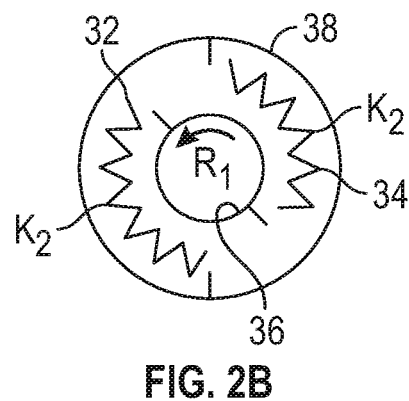
FIG. 2B is a schematic end view of an isolator pulley assembly for a powertrain assembly in a second position according to the principles of the present disclosure.
Figure 2C:
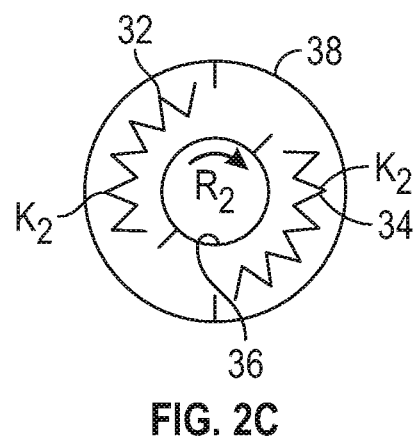
FIG. 2C is a schematic end view of an isolator pulley assembly for a powertrain assembly in a third position according to the principles of the present disclosure.

Examples of the present disclosure advantageously provide a method of controlling a powertrain for a vehicle. Referring to the drawings, wherein like reference numbers refer to like components, FIG. 1 illustrates an example of a powertrain assembly, designated with the reference number 10. The powertrain assembly 10 includes an internal combustion engine (ICE) 12, a transmission assembly 14, a motor generator unit (MGU) 16, a driveshaft 18, a rear differential 20, a rear drive axle 22, rear wheels 24, and a powertrain control module (PCM) 26. More particularly, the ICE 12 includes, among a number of other members, a crankshaft 28 and an isolator pulley assembly 30. The crankshaft 28 is used to translate linear force produced by a piston (not shown) in a combustion chamber to rotational torque delivered to each of the transmission assembly 14 and the isolator pulley assembly 30. The isolator pulley assembly 30, shown individually in FIGS. 2A, 2B, 2C, includes a first spring 32, a second spring 34, a first member 36, and a second member 38. The first and second springs 32, 34 dampen vibrations created by the ICE 12. When the first member 36 and the second ember 38 are disposed in a first neutral position relative to each other, the first and second springs 32, 34, have a first spring constant K1. When the first member 36 rotates in first direction R1 as shown in FIG. 2B, the first and second springs 32, 34 have a second spring constant K2. When the first member 36 reverses direction to a second direction R2 as shown in FIG. 2C, the first and second springs 32, 34 go through the neutral position shown in FIG. 2A rotating in a second direction R2 and having the second spring constant K2. The first spring constant K1, which in this example is also known as a soft spring constant compared to the second spring constant K2, is configured to dampen torsional idle oscillations created by firing impulses. Additionally, the second spring constant K2 is configured to dampen bending vibrations.

The first member 36 is connected for common rotation to the crankshaft 28 of the ICE 12. In the present example, the second member 38 takes the form of a belt pulley. However, other types of torque transfer mechanisms may be employed in the present example without departing from this disclosure. In another example, the second member 38 may be a chain sprocket or a gear.

For example, the first set of springs 32 having the first spring constant K1, which in this example is also known as a soft spring compared to the second spring constant K2, is configured to dampen torsional idle oscillations created by firing impulses. Additionally, the second set of springs 34 having the second spring constant K2 is configured to dampen bending vibrations.

The MGU 16 includes a third member 40 drivingly connected to the second member 38 through a belt 42. The third member 40 in this example is also a belt pulley. The third member 40 is drivingly connected to the MGU 16 and provides both torque input to the MGU 16 and delivers torque generated by the MGU 16 to the second member 38. Thus, the isolator pulley assembly 30 is capable of both delivering torque to the belt 42 and receiving torque from the belt 42. In this regard, the torque applied to the isolator pulley assembly 30 can reverse or swing from high positive torque to high negative torque in a short time. As a result, sudden change in torque direction may cause the isolator pulley assembly 30 to pass through a soft spring zone of the first set of springs 32 and cause a "bump" to occur as the speed 62 of the MGU 16 recoils from being out of phase with the speed 60 of the crankshaft 28. Therefore, a method 100 of controlling the powertrain assembly 10 is required to avoid the "bump" and other objectionable results of lash in the isolator pulley assembly 30 and belt 42.

Referring now back to FIG. 1, the PCM 26 is preferably an electronic control device having a preprogrammed digital computer or processor, control logic, memory used to store data, and at least one I/O peripheral. The control logic includes a plurality of logic routines for monitoring, manipulating, and generating data. The PCM 26 controls the plurality of actuators, pumps, valves, and other devices associated with ICE 12 control according to the principles of the present disclosure. The control logic may be implemented in hardware, software, or a combination of hardware and software. For example, control logic may be in the form of program code that is stored on the electronic memory storage and executable by the processor. The PCM 26 receives the output signal of each of several sensors on the vehicle, performs the control logic and sends command signals the several control devices.

Figure 3:
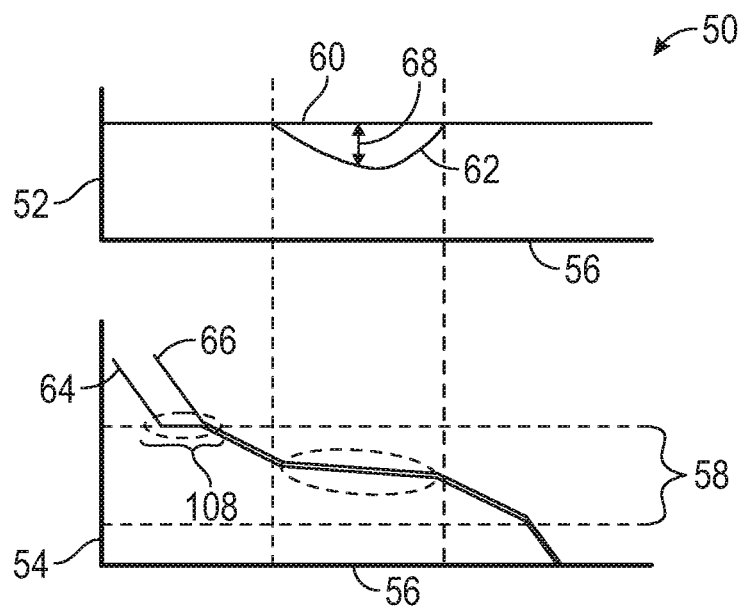
FIG. 3 is a chart depicting a method of controlling a powertrain assembly according to the principles of the present disclosure.
Figure 4:
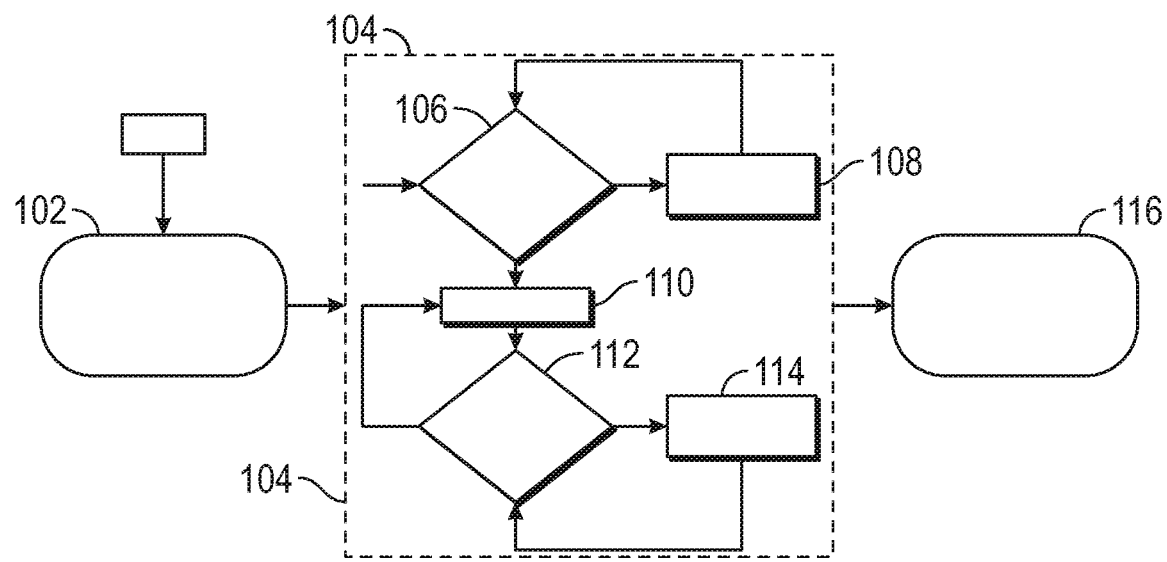
FIG. 4 is a flowchart depicting a method of controlling a powertrain assembly according to the principles of the present disclosure.

Turning to FIGS. 3 and 4, FIG. 3 demonstrates a Speed (RPM) 52 and Torque (Nm) 54 vs. Time (s) 56 graph 50 for the powertrain assembly 10 with FIG. 4 illustrating a flow chart for a method 100 of controlling the powertrain assembly 10. A soft spring lash zone 58 is represents a mode of the isolator pulley assembly 30 where the torque is applied to the first and second set of springs 32, 34 by, for example, the first member 36 and does not immediately transfer to the opposite second member 38 due to the low spring constant $K_r$. Steady state speed 60 of the ICE 12 and a speed 62 of the MGU 16 are shown in the speed 52 vs. Time 56 graph 50. Command torque 64 of the MGU 16 and the actual motor torque 66 of the MGU 16 are shown in the torque 54 vs. Time 56 graph 50.

The method 100 shown in FIG. 4 begins with a first step 102 for detecting the command torque 64 of the MGU 16 is within the soft spring lash zone 58. If so, then a Lash Zone control method 104 is activated. If the command torque 64 of the MGU 16 is not within the soft spring lash zone 58 then the Lash Zone control method 104 is not activated 116. The Lash Zone control method 104 begins with a second step 106 of deciding if the command torque 64 is within an achievable threshold. If not, a compensating communication delay 108 for command torque 64 is applied. In this manner, the actual motor torque 66 has a chance to catch-up to the command torque 64. Next, the method returns to the second step 106. Alternatively, if the command torque 64 is within an achievable threshold then a fourth step 110 applies Lash Zone rate limits which are limits on the rate of increase in command torque 64. A fifth step 112 determines if the difference 68 between the steady state speed 60 of the ICE 12 and the speed 62 of the MGU 16. If this difference is greater than a particular threshold, then a variable rate of change limit of command torque 64 is applied. If not, then the Lash Zone rate limits of the fourth step 110 applies.

Figure 5:
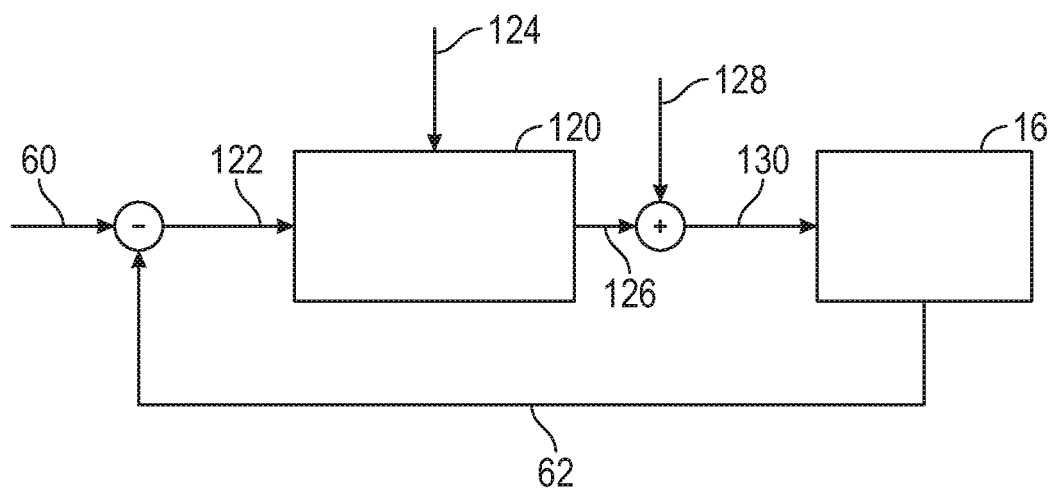
FIG. 5 is a flowchart depicting another method of controlling a powertrain assembly according to the principles of the present disclosure.

The Lash Zone rate limits are determined as shown in FIG. 5. The Lash Zone rate limit function 120 requires an input of the difference or error 122 between the steady state speed 60 of the ICE 12 and the speed 62 of the MGU 16 in the crankshaft domain (or at the second member 38 of the isolator pulley assembly 30). A command torque 124 is another required input into the Lash Zone rate limit function 120 producing a torque rate of change 126. The torque rate of change 126 is combined with a previous torque rate of change 128 resulting in a current torque rate of change 130 to be commanded to the MGU 16.

Figure 6:
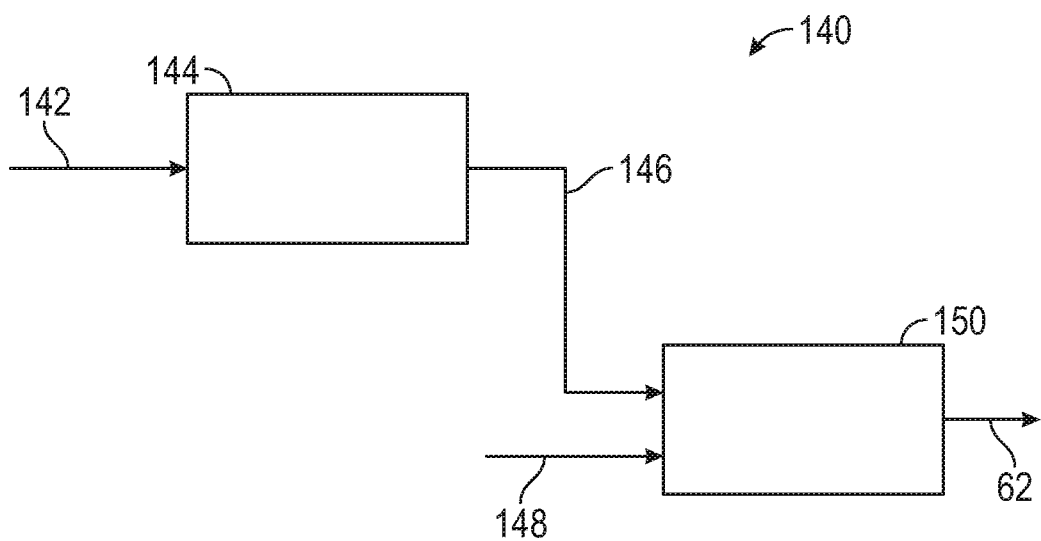
FIG. 6 is a flowchart depicting yet another method of controlling a powertrain assembly according to the principles of the present disclosure.

The Lash Zone rate limits as determined by the function of FIG. 5 relies heavily upon the accuracy of the speed 62 of the MGU 16. Due to the nature of the design of this example of the powertrain assembly 10 a significant source of error 122 is belt slip. Thus, belt slip function 140 is determined for as shown in FIG. 6. The speed 142 of the MGU 16 at the MGU 16 is fed into the pulley ratio function 144 resulting in a pulley speed 146. A belt slip compensation 148 produces the speed 62 of the MGU 16 in the crankshaft domain using the pulley speed 146 and the torque 150 of the MGU 16.

Referring now back to FIG. 1, the PCM 26 is preferably an electronic control device having a preprogrammed digital computer or processor, control logic, memory used to store data, and at least one I/O peripheral. The control logic includes a plurality of logic routines for monitoring, manipulating, and generating data. The PCM 26 controls the plurality of actuators, pumps, valves, and other devices associated with ICE 12 control according to the principles of the present disclosure. The control logic may be implemented in hardware, software, or a combination of hardware and software. For example, control logic may be in the form of program code that is stored on the electronic memory storage and executable by the processor. The PCM 26 receives the output signal of each of several sensors on the vehicle, performs the control logic and sends command signals the several control devices.

A first control logic sequence implemented in software program code that is executable by the processor of the PCM 26 includes a first control logic for detecting that the command torque 64 of the MGU 16 is within the soft spring lash zone 58. If the command torque 64 of the MGU 16 is within the soft spring lash zone 58, a second control logic decides if the command torque 64 is within an achievable threshold. If not, a third control logic applies a compensating communication delay 108 for command torque 64. In this manner, the actual motor torque 66 has a chance to catch-up to the command torque 64. Next, the second control logic is processed again. Alternatively, if the command torque 64 is within an achievable threshold then a fourth control logic applies Lash Zone rate limits limiting the rate of increase in command torque 64. A fifth control logic determines if the difference 68 between the steady state speed 60 of the ICE 12 and the speed 62 of the MGU 16. If this difference is greater than a particular threshold, then a variable rate of change limit of command torque 64 is applied in a sixth control logic. If not, then the Lash Zone rate limits applies. If this difference is greater than a particular threshold, then a variable rate of change limit of command torque 64 is applied in a seventh control logic.

A second control logic sequence is used to determine the Lash Zone rate limits used in the first control logic sequence. An eighth control logic requires an input of the difference or error 122 between the steady state speed 60 of the ICE 12 and the speed 62 of the MGU 16 in the crankshaft domain (or at the second member 38 of the isolator pulley assembly 30). A command torque 124 is another required input into the Lash Zone rate limit function 120 producing a torque rate of change 126. A ninth control logic combines the torque rate of change 126 with a previous torque rate of change 128 resulting in a current torque rate of change 130 to be commanded to the MGU 16.

A third control logic sequence determines the amount of belt slip for which to account. Thus, a tenth control logic applies a belt slip compensation 148 to which uses the speed 142 of the MGU 16 and the pulley ratio function 144 resulting in a pulley speed 146. The belt slip compensation 148 produces the speed 62 of the MGU 16 in the crankshaft domain using the pulley speed 146 and the torque 150 of the MGU.

While examples have been described in detail, those familiar with the art to which this disclosure relates will recognize various alternative designs and examples for practicing the disclosed structure within the scope of the appended claims.

The following is claimed:

1. A powertrain system for a vehicle, the powertrain system comprising:
   an internal combustion engine comprising a crankshaft;
   an isolator assembly having a first member and a second member, and wherein the first member is fixedly connected for common rotation with the crankshaft of the internal combustion engine;
   a motor generator unit having a third member, and wherein the third member of the motor generator unit is coupled with the second member of the isolator assembly for torque transfer; and
   a powertrain control module includes a control logic sequence, and wherein the powertrain control module is in communication with the internal combustion engine and the motor generator unit and controls the powertrain system,
   wherein the control logic sequence of the powertrain control module comprises:
   a first control logic for determining when a command torque of the motor generator unit is within a soft spring lash zone;
   a second control logic for deciding when the command torque is within an achievable threshold when the command torque is within the soft spring lash zone;
   a third control logic for applying a compensating communication delay for the command torque when the command torque is not within the achievable threshold; and
   a fourth control logic for applying a lash zone rate limit when the command torque is within the achievable threshold.

2. The powertrain system of claim 1 wherein the isolator assembly further comprises a first set of resilient members and a second set of resilient members, the first and second set of resilient members are disposed between the first member and the second member, and the second member of the isolator assembly is a first pulley.

3. The powertrain system of claim 2 wherein the first set of resilient members of the isolator assembly are a first set of springs having a first spring constant and the second set of resilient members of the isolator assembly are a second set of springs having a second spring constant.

4. The powertrain system of claim 3 wherein the third member of the motor generator unit is a second pulley, and the powertrain system further comprises a belt disposed on the first pulley of the isolator assembly and the second pulley of the motor generator unit.

5. The powertrain system of claim 1 wherein the control logic sequence of the powertrain control module further comprises:
 a fifth control logic for determining when a first error between a steady state speed of the internal combustion engine and a speed of the motor generator unit; and
 a sixth control logic for applying a variable rate of change limit on the command torque when the first error is greater than a particular threshold.

6. The powertrain system of claim 5 wherein the control logic sequence further comprises a seventh control logic for determining an amount of belt slip for which to account for by applying a belt slip compensation which uses the speed of the motor generator unit and a pulley ratio function resulting in a pulley speed and produces the speed of the motor generator unit in a crankshaft domain using the pulley speed and a torque of the motor generator unit.

7. The powertrain system of claim 6 wherein the fourth control logic for applying a lash zone rate limit when the command torque is within an achievable threshold further comprises applying a lash zone rate limit as determined by finding a second error between a speed of the internal combustion engine and the speed of the motor generator unit in the crankshaft domain and producing the torque rate of change using the second error, a rate limit function, and the command torque.

8. A method of controlling a powertrain system, the method comprising:
 determining when a command torque of a motor generator unit is within a soft spring lash zone;
 deciding when the command torque is within an achievable threshold when the command torque is with the soft spring lash zone;
 applying a compensating communication delay for the command torque when the command torque is not within the achievable threshold;
 applying a lash zone rate limit when the command torque is within the achievable threshold;
 determining when a first error between a steady state speed of an internal combustion engine and a speed of the motor generator unit, and
 applying a variable rate of change limit on the command torque when the first error is greater than a particular threshold.

9. The method of claim 8, further comprising providing the powertrain system having the internal combustion engine, an isolator assembly, and the motor generator unit, wherein the isolator assembly further comprises a first member and a second member, and wherein the first member is fixedly connected for common rotation with a crankshaft of the internal combustion engine.

10. The method of claim 8, further comprising providing the powertrain system having the internal combustion engine, an isolator assembly, the motor generator unit, and a belt, and wherein the isolator assembly comprises a first member and a second member, the second member is a first pulley, the first member is fixedly connected for common rotation with a crankshaft of the internal combustion engine and the belt couples the first pulley of the isolator to a second pulley of the motor generator unit.

11. The method of claim 10 further comprising determining an amount of belt slip for which to account for by applying a belt slip compensation which uses the speed of the motor generator unit and a pulley ratio function resulting in a first pulley speed and produces the speed of the motor generator unit in a crankshaft domain using the first pulley speed and a torque of the motor generator unit.

12. The method of claim 9 wherein providing the powertrain system having an internal combustion engine, an isolator assembly, and a motor generator unit, and wherein the isolator assembly having a first member and a second member, and wherein the first member is fixedly connected for common rotation with a crankshaft of the internal combustion engine further comprises providing the powertrain system comprising an internal combustion engine, an isolator assembly, and a motor generator unit, and wherein the isolator assembly having a first member and a second member, and wherein the first member is fixedly connected for common rotation with a crankshaft of the internal combustion engine, and wherein the motor generator unit comprises a third member coupled with the second member of the isolator assembly for torque transfer.

13. The method of claim 12 wherein applying a lash zone rate limit when the command torque is within an achievable threshold further comprises applying a lash zone rate limit as determined by finding a first error between a speed of the internal combustion engine and a speed of the motor generator unit in a crankshaft domain and producing a torque rate of change using the speed error, a rate limit function, and the command torque.

14. The method of claim 12 wherein applying a lash zone rate limit as determined by finding a first error between a speed of the internal combustion engine and a speed of the motor generator unit in a crankshaft domain, and producing a torque rate of change using the speed error, a rate limit function, and the command torque further comprises applying a lash zone rate limit as determined by finding a first error between a speed of the internal combustion engine and a speed of the motor generator unit in a crankshaft domain, producing a torque rate of change using the speed error, a rate limit function, and combining the torque rate of change with a previous torque rate of change resulting in a current torque rate of change to be commanded to the motor generator unit.

15. A method of controlling a powertrain system, the method comprising:
 providing the powertrain system having an internal combustion engine, an isolator assembly, and a motor generator unit, and wherein the isolator assembly comprises a first member and a second member, and wherein the first member is fixedly connected for common rotation with a crankshaft of the internal combustion engine;
 determining when a command torque of the motor generator unit is within a soft spring lash zone;
 deciding when the command torque is within an achievable threshold when the command torque is with the soft spring lash zone;
 applying a compensating communication delay for the command torque when the command torque is not within the achievable threshold;
 applying a lash zone rate limit as determined by finding a first error between a speed of the internal combustion engine and a speed of the motor generator unit in a crankshaft domain and producing a torque rate of change using the first error, a rate limit function, and the command torque;

determining when a first error between a steady state speed of the internal combustion engine and a speed of the motor generator unit, and applying a variable rate of change limit on the command torque when the first error is greater than a particular threshold.

16. The method of claim 15 wherein providing the powertrain system comprising an internal combustion engine, an isolator assembly, and a motor generator unit further comprises providing the powertrain system comprising an internal combustion engine, an isolator assembly, a motor generator unit, and a belt, and wherein the isolator assembly having a first member and a second member, the second member is a first pulley, the first member is fixedly connected for common rotation with a crankshaft of the internal combustion engine and the belt couples the first pulley of the isolator to a second pulley of the motor generator unit.

17. The method of claim 16 further comprising determining an amount of belt slip for which to account for by applying a belt slip compensation which uses the speed of the motor generator unit and a pulley ratio function resulting in a first pulley speed and produces the speed of the motor generator unit in the crankshaft domain using the first pulley speed and a torque of the motor generator unit.

18. The method of claim 17 wherein providing the powertrain system comprising an internal combustion engine, an isolator assembly, and a motor generator unit, and wherein the isolator assembly having a first member and a second member, and wherein the first member is fixedly connected for common rotation with a crankshaft of the internal combustion engine further comprises providing the powertrain system including an internal combustion engine, an isolator assembly, and a motor generator unit, and wherein the isolator assembly comprises a first member and a second member, and wherein the first member is fixedly connected for common rotation with a crankshaft of the internal combustion engine, and wherein the motor generator unit has a third member coupled with the second member of the isolator assembly for torque transfer.

19. The method of claim 18 wherein applying a lash zone rate limit as determined by finding a first error between a speed of the internal combustion engine and a speed of the motor generator unit in a crankshaft domain, and producing a torque rate of change using the first error, a rate limit function, and the command torque further comprises applying a lash zone rate limit as determined by finding a first error between a speed of the internal combustion engine and a speed of the motor generator unit in a crankshaft domain, producing a torque rate of change using the speed error, a rate limit function, and combining the torque rate of change with a previous torque rate of change resulting in a current torque rate of change to be commanded to the motor generator unit.

\* \* \* \* \*